United States Patent [19]

Ramohalli

[11] Patent Number: 5,120,008
[45] Date of Patent: Jun. 9, 1992

[54] ORBITAL DEBRIS PROCESSOR AND METHOD THEREFOR

[76] Inventor: Kumar Ramohalli, 5205 E. Camino Apolena, Tucson, Ariz. 85718

[21] Appl. No.: 387,583

[22] Filed: Jul. 28, 1989

[51] Int. Cl.[5] .......................... B64G 1/10; B64G 1/44; F24J 2/02; F24J 2/38
[52] U.S. Cl. ................................ 244/158 R; 359/503; 359/742; 244/173; 126/451; 126/424
[58] Field of Search ............... 126/424, 440, 417, 451; 350/574, 575, 576, 452; 244/158 R, 173

[56] References Cited

U.S. PATENT DOCUMENTS

| | | | |
|---|---|---|---|
| 1,479,923 | 1/1924 | Moreau | 126/440 |
| 3,152,260 | 10/1964 | Cummings | 244/173 |
| 4,371,135 | 2/1983 | Keigler | 244/173 |
| 4,439,020 | 3/1984 | Maruko | 350/504 X |
| 4,936,528 | 6/1990 | Butner et al. | 244/158 R |
| 4,991,799 | 2/1991 | Petro | 244/158 R |

FOREIGN PATENT DOCUMENTS 2-103342   4/1990   Japan .................................. 126/451

OTHER PUBLICATIONS

Ramohalli, Kumar et al "Autonomous Space Process for Orbital Debris" *Universities Space Research Association Summer Conference*, Jun. 12-16, 1989.

*Primary Examiner*—Bruce Y. Arnold
*Assistant Examiner*—David R. Parsons
*Attorney, Agent, or Firm*—Harry M. Weiss; Antonio R. Durando

[57] ABSTRACT

An orbital debris processor includes a square shaped central lens connected to four square shaped satellite lenses. All of the lenses have substantially the same focal length. The lenses are disposed to cause columnated light, parallel to respective axes thereof, to be focussed a substantially a single point. When the debris procesor is oriented to cause solar radiation to be parallel to the axis of the central lens, reflectors reflect solar radiation to the satellite lenses parallel to respective axes thereof. When a metal object is positioned at the point, it is locally melted and this enables a cut to be made. These cut pieces can be used by the processor or stored in a bin.

7 Claims, 2 Drawing Sheets

ORBITAL DEBRIS PROCESSOR AND METHOD THEREFOR

BACKGROUND OF THE INVENTION

1. Field of the Invention

This invention relates to removal of debris from an orbit about the earth and methods therefore and, more particularly to cutting, storing, utilizing and disposing of debris in space and a method therefore.

2. Background of the Invention

In the early 1970's, the North American Air Defense Command (NORAD) made a study of objects comprising debris in a low earth orbit (350-500 miles above the surface of the earth); there were approximately 2200 such objects. NORAD concluded that although the debris was of some concern, the probability of a collision between an artificial satellite and one of the objects was not significant. Moreover, the artificial satellite would have to have a diameter greater than 100 meters before the probability would become significant.

In the mid 1970's, NASA's Langley Research center predicted that the debris comprised approximately 5000 objects. In the late 1970's, studies concluded that a collision would be a major source of debris, and would occur perhaps as early as the 1990's. Therefore, the probability of the collision is of increasing significance.

The objects have a typical velocity of 7-10 kilometers per second. Therefore, when one of the objects has a one gram mass, it possesses the same kinetic energy as a 50 gram bullet traveling at 3300 feet per second; a 25 gram mass possesses the same kinetic energy as a 3000 pound automobile traveling at 60 miles per hour.

Because of the kinetic energy, when one of the objects comprised a paint flake, it damaged the window of the Shuttle, Challenger. Additionally, damage from similar causes was sustained by window louvres of the satellite, Solar Max. Hence a small object is a potential cause of a disaster.

Since the debris may be radioactive, it is a threat to the environment on earth. The crash of the nuclear powered Russian satellite, Kosmos 954, for example, resulted in a fallout of radioactive debris in Canada. The crash could not have been averted because there was nothing available to safely remove the satellite from orbit.

Astronomers have long preferred a space-based observatory because vision of the skies from the earth is reduced by city lights, atmospheric contaminants and haze. Recently, the astronomers have found that vision from the space-based observatory is noticeably obscured by the debris. Therefore the debris is a hindrance to astronomic observation.

It should be understood that the debris may, for example, include a solar panel which is reusable. Therefore, although the debris is a hazard and sometimes a hindrance, it may often be regarded as a reusable resource.

For reasons given hereinbefore, there is a need to rapidly remove as much of the debris from earth orbits as soon as possible to prevent a proliferation of debris due to collisions. Additionally, it is desireable to reuse as much of the debris as possible. Current space technology makes it possible to automatically analyze a piece of space debris and determine whether it can be reused or not. If it can, the piece is reused according to predetermined applications programmed into the system. If not, the debris is stored for later removal. This technology is all well described in the prior art.

SUMMARY OF THE INVENTION

An object of the present invention is to remove debris from space and method therefore.

Another object of the present invention is to reuse debris in space.

According to the present invention, solar rays are directed parallel to the axes of a plurality of lenses. The solar rays are focussed by the lenses at substantially one focal point. A robot arm is operable to move an object to the focal point where the concentrated solar energy produces localized melting of any object located there and to locations that do not occlude the lenses.

Apparatus of the present invention can retrieve debris from space having a combined mass of about ten times greater than the mass of the apparatus. The debris may be alternatively burned, made to reenter the earth's atmosphere over an ocean, or be retrieved by another craft such as the Space Shuttle.

These and other objects, features and advantage of the present invention, as well as details of a preferred embodiment thereof can be more fully understood from the following description and drawing.

DESCRIPTION OF THE PREFERRED EMBODIMENT

The present invention is predicated upon a plurality of lenses focussing solar radiation at substantially a single point. When a piece of metal, for example, is disposed at the point, the focussed solar radiation causes the metal to melt. It should be understood that in a low earth orbit, the suns rays are about 40% more intense than they are at the surface of the earth.

Figure 1:
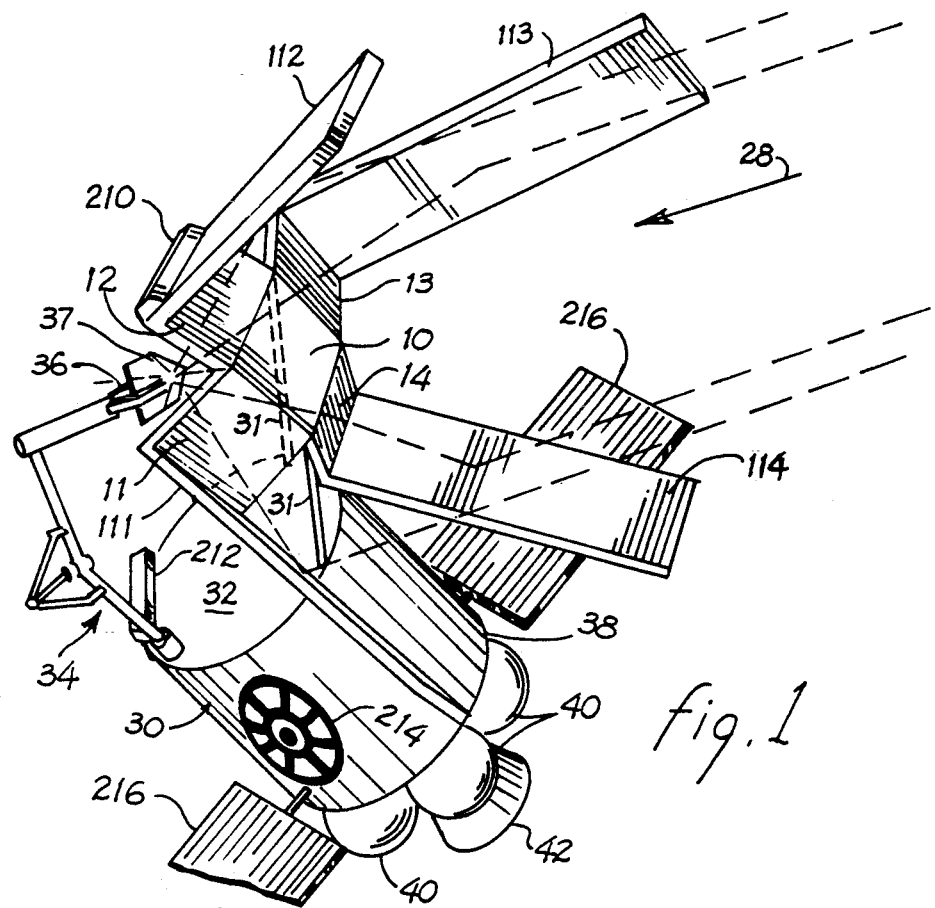
FIG. 1 is a perspective view of the preferred embodiment of the present invention.
Figure 2:
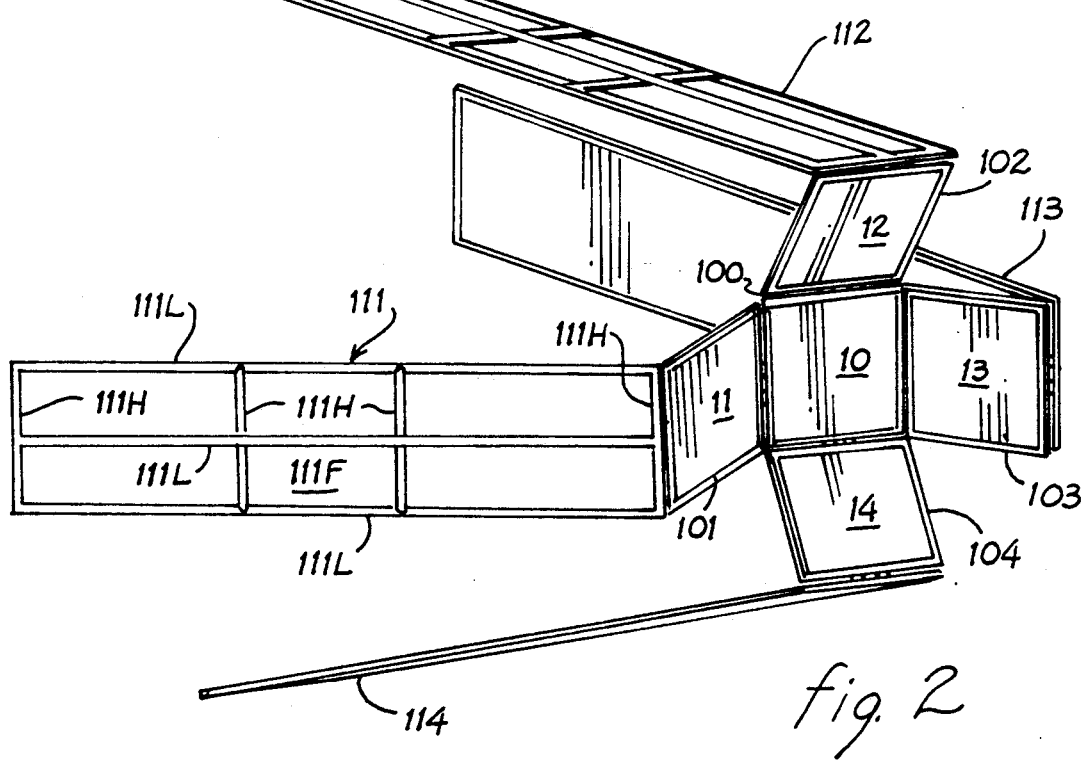
FIG. 2 is perspective view of optical elements in the embodiment of FIG. 1.

As shown in FIGS. 1 and 2, an orbital debris processor includes a central square shaped Fresnel lenses 10 and satellite square shaped Fresnel lenses 11-14 within aluminum frames 100-104, respectively. Lenses 10-14 are similar and have substantially the same focal length.

Frames 100, 101, are connected together in any suitable manner to cause lenses 10, 11 to have a known lens angle therebetween. Frames 100, 102 frames 100, 103 and frames 100, 104 are connected together in a similar manner. The lens angle is chosen to cause the distance from lenses 10-14 to a point, F, to equal the focal length.

Figure 3:
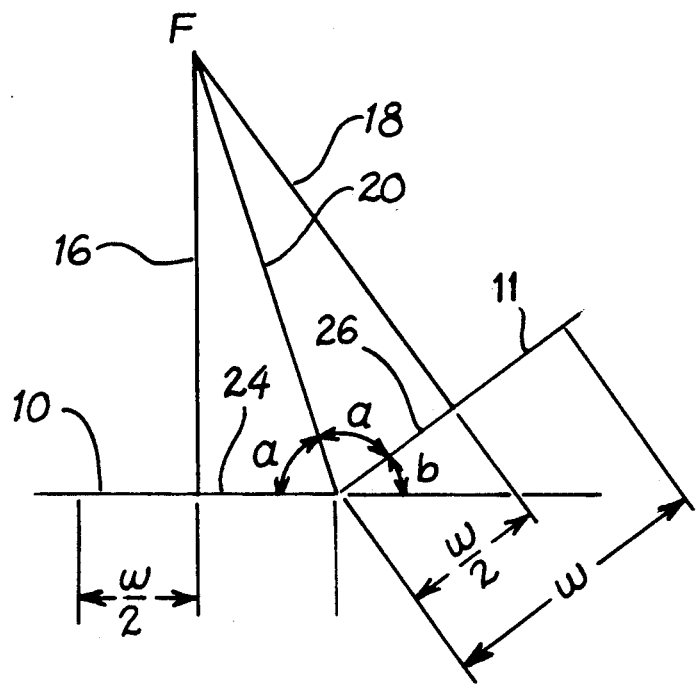
FIG. 3 is a diagrammatic showing of a relationship of a lens angle to the size of lenses and their focal lengths in the embodiment of FIG. 1.

As shown in FIG. 3, the focal length of lens 10 is represented by a line 16 that extends from lens 10, along the optical axis thereof, to point F. Similarly, the focal length of lens 11 is represented by a line 18 that extends from lens 11, along the optical axis thereof, to point F. Lines 16, 18 are of equal length because of the equal focal lengths.

Because lines 16, 18 are of equal length, line 20 and a surface 24 of lens 10 intersect to form an angle equal to that formed by the intersection of line 20 and a surface 26 of lens 11. Therefore, the lens angle between lenses 10, 11 is in accordance with a first trigonometric relationship which is given as:

$$b = 180 - 2a$$

where
 b is the lens angle; and
 a is the angle between line 20 and surface 24 (and between line 20 and surface 26).

The angle, a, is in accordance with a second trigonometric relationship which is given as:

$$a = \tan^{-1}(2F1/w)$$

where F1 is the length of lines 16, 18 (the focal length of lenses 10, 11); and
 w is the length of a side of lenses 10, 11.

When the first and second relationships are combined, a third trigonometric relationship is provided which is given as:

$$b = 180 - 2\tan^{-1}(2F1/w)$$

Therefore, the lens angle may be determined from the length of the side and the focal length. Since lenses 10-14 are similar to each other, the lens angles between lenses 10, 12, lenses 10, 13 and lenses 10, 14 are ideally equal to the lens angle, b.

The orbital debris processor additionally includes similar planar reflectors 111-114 (FIG. 2). Reflector 111 has aluminum frame members 111H, 111L that are connected together in any suitable manner. Members 111H, 111L are all connected to one side of a sheet of foil 111F. Preferably, foil 111F is made from gold because it is a good reflector of infrared radiation. It should be appreciated that the solar radiation has a much greater component of infrared in the low earth orbit than it has at the surface of the earth. Reflectors 112-114 are similar to reflector 111.

Reflector 111 is connected to frame 101 with a known reflector angle c (FIG. 4), defined below, between reflector 111 and the optical axis of lens 11. Reflectors 112-114 are respectively connected to frames 102-104 in a similar manner. As explained hereinafter, reflectors 111-114 reflect solar radiation to lenses 11-14, respectively, whereby collimated radiation is directed to lenses 11-14. Moreover, the direction of the reflected radiation to lenses 11-14 is parallel to their respective optical axes.

Figure 4:
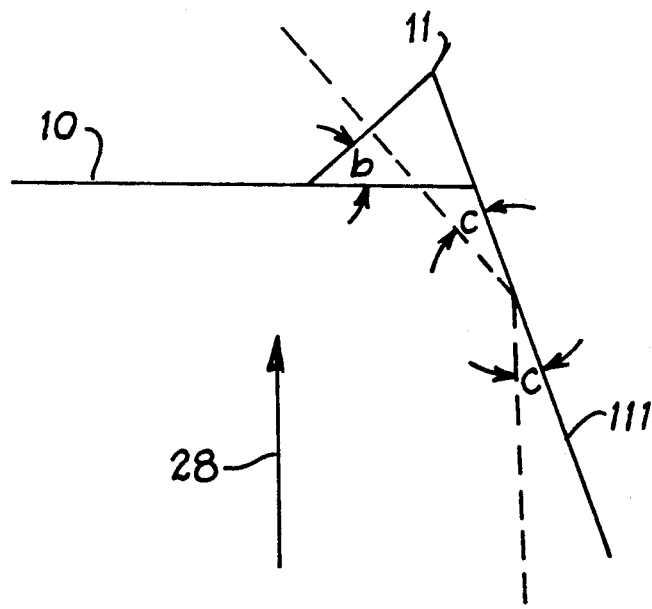
FIG. 4 is a diagrammatic showing of a relationship of a reflector angle to a lens angle in the embodiment of FIG. 1.

As shown in FIG. 4., the debris processor is preferably positioned with the solar radiation in the direction of an arrow 28 which is parallel to the optical axis of lens 10 whereby collimated radiation is directed to lens 10. The reflector angle is in accordance with a fourth trigonometric relationship which is given as:

$$c = b/2$$

where c is the reflector angle.

The orbital processor preferably has mounted thereon an ultraviolet camera 210 and an infrared camera 212 to provide a remote viewing of debris. The ultraviolet camera provides a view of details of debris that may not be attainable with other types of cameras.

The infrared camera identifies radiation from debris. Hence, the infrared camera could identify debris such as a computer or a solar panel. When the solar panel is found it may be connected for use by the debris processor. Ultraviolet and infrared cameras are well known in the art.

Frames 101-103 are connected to a cylindrically shaped container 30 in any suitable manner, such as by beams 31 (FIG. 1). Additionally container 30 has an end 32 connected to one end of a robot arm 34. The other end of arm 34 is connected to a forceps 36.

Arm 34 and forceps 36 are connected to a remotely controlled robotic control system (not shown). The robotic control system is operable to manipulate arm 34 and forceps 36 to grasp debris, such as object 37, and position it at the point, F (FIG. 3). Robotic systems are well known in the art.

Within container 30 are reaction wheels 214 that may have a torque applied thereto in response to a remote command to alter the orientation of the debris processor. Reaction wheels are well known in the aerospace arts.

An end 38 of container 30 is connected to plurality of propellant tanks 40 and to a rocket engine 42. Propellant tanks 40 store fuel for rocket thrusters (not shown) and engine 42. Typically, engine 42 is used to cause the orbital processor to change orbits.

The orbital processor additionally includes solar panels 216 that are used as a source of power for electrically powered elements, such as those of the robotic system. Solar panels are well known in the aerospace arts.

Typically, a mission of the orbital processor begins with processing a first targeted object which is farthest from the earth. Since the orbital processor has not processed any debris, it is in its lightest configuration. Hence, a minimal amount of propellant is required to propel the processor to its farthest orbit from the earth.

When the first targeted object is processed, arm 34 and forceps 36 are used to place the first processed object at a location that does not occlude lenses 10-14.

A Hohmann transfer is used to move the orbital processor in a lower orbit to process a second targeted object. The second targeted object is processed in a manner similar to the processing of the first targeted object. As known to those skilled in the art, the Hohmann transfer minimizes consumption of propellant. In a similar manner targeted objects in successively lower orbits are processed.

It is estimated that in a single mission, the orbital processor can process targeted objects having a total mass of about ten times the mass of the orbital processor. A limitation of the mass of the processed targeted objects is related to the mechanical stability of the orbital processor. At the end of the mission, the processed targeted objects are either collected in a vehicle, such as a space shuttle, or forced into the earth's atmosphere to burn or splash down in a remote ocean spot.

While the invention has been particularly shown and described with respect to a preferred embodiment thereof, it should be understood by those skilled in the art that changes in form and detail may be made therein without departing from the spirit and the scope of the invention.

What is claimed is:

1. An apparatus for retrieving a targeted object in space, for cutting it by localized melting, and for disposing of the resulting parts, comprising, in combination:
   a rocket engine, including a plurality of propellant tanks, for maneuvering said apparatus in space;

a container, connected to said rocket engine, for providing storage for said resulting parts produced by localized melting;

a central lens and a plurality of satellite lenses and corresponding reflectors, connected to said container, that focus collimated light incident upon said lenses and reflectors in directions parallel to the respective optical axes of said lenses, substantially to a common focal point;

a robot arm, connected to said container, operable to grasp and move said targeted object to said common focal point and to locations that do not occlude said lenses;

a plurality of reaction wheels acting on said container to alter the orientation of said apparatus so as to cause the optical axis of said central lens to be parallel to solar radiation;

means for providing a remote view of said targeted object;

a remotely controlled robotic control system for operating said robot arm; and a multiplicity of solar panels to provide a source of power for electrically powered elements in said apparatus.

2. The apparatus of claim 1, wherein said central lens and said plurality of satellite lenses include similar, square-shaped, Fresnel lenses having substantially the same focal length, and wherein the lens angle between said central lens and each of the lenses in aid multiplicity of satellite lenses is in accordance with a relationship given as:

$$b = 180 - 2\tan^{-1}(2F1/w)$$

where
 b is said lens angle;
 F1 is said focal length; and
 w is the length of a side of said central lens.

3. The apparatus of claim 1, wherein each of said reflectors consists of a planar reflector.

4. The apparatus of claim 3, wherein each of said reflectors is made from gold.

5. The apparatus of claim 1, wherein said means for providing a remote view of said targeted object consists of an ultraviolet camera mounted on said apparatus.

6. The apparatus of claim 1, further comprising an infrared camera mounted on said apparatus capable of identifying radiation emitted from said targeted object.

7. The apparatus of claim 6, wherein said means for providing a remote view of said targeted object consists of an ultraviolet camera mounted on said apparatus.

* * * * *